US009465163B2

(12) United States Patent
Kumar et al.

(10) Patent No.: US 9,465,163 B2
(45) Date of Patent: Oct. 11, 2016

(54) HIGH-ORDER-MODE FILTER FOR SEMICONDUCTOR WAVEGUIDES

(71) Applicant: Skorpios Technologies, Inc., Albuquerque, NM (US)

(72) Inventors: Nikhil Kumar, Albuquerque, NM (US); Guoliang Li, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 14/642,429

(22) Filed: Mar. 9, 2015

(65) Prior Publication Data

US 2015/0253472 A1 Sep. 10, 2015

Related U.S. Application Data

(60) Provisional application No. 61/949,916, filed on Mar. 7, 2014.

(51) Int. Cl.
*G02B 6/12* (2006.01)
*G02B 6/122* (2006.01)
*G02B 6/14* (2006.01)
*G02F 1/35* (2006.01)
*G02B 5/20* (2006.01)
*G02F 1/365* (2006.01)

(52) U.S. Cl.
CPC ............ *G02B 6/122* (2013.01); *G02B 6/14* (2013.01); *G02B 5/20* (2013.01); *G02B 2006/12109* (2013.01); *G02F 1/3501* (2013.01); *G02F 1/365* (2013.01); *G02F 2001/3509* (2013.01)

(58) Field of Classification Search
CPC ............... G02B 6/122; G02B 6/14; G02B 2006/12109; G02B 5/20; G02F 1/3501; G02F 1/365; G02F 2001/3509
USPC .............. 385/14–15, 27–31, 129–132
See application file for complete search history.

(56) References Cited

U.S. PATENT DOCUMENTS

| | | | | |
|---|---|---|---|---|
| 4,389,567 A * | 6/1983 | Khoe | ............... | G02B 6/125 250/214 LA |
| 4,799,749 A * | 1/1989 | Borner | ............... | G02B 6/12002 385/132 |
| 4,886,538 A * | 12/1989 | Mahapatra | .......... | C03C 23/0025 264/1.24 |
| 5,454,058 A | 9/1995 | Mace et al. | | |
| 5,586,209 A * | 12/1996 | Matsuura | ........... | G02B 6/12007 385/132 |
| 5,633,512 A * | 5/1997 | Okuda | ............... | H01L 31/1123 257/192 |

(Continued)

OTHER PUBLICATIONS

"Evanescent Waveguide Couplers" *Lumberical Knowledge Base*. Web. Mar. 6, 2015. <http://docs.lumerical.com/en/index.html?pic_passive_waveguide_couplers_evanescent.html>.

*Primary Examiner* — Thomas A Hollweg
*Assistant Examiner* — Guy Anderson
(74) *Attorney, Agent, or Firm* — Kilpatrick Townsend & Stockton LLP

(57) ABSTRACT

A high-order-mode (HOM) filter for thick silicon waveguides has a shoulder slab, a waveguide ridge, a first filter ridge, and a second filter ridge. The first filter ridge and the second filter ridge help attenuate higher-order modes from the waveguide ridge while the waveguide ridge guides a fundamental mode.

15 Claims, 8 Drawing Sheets

(56) References Cited

U.S. PATENT DOCUMENTS

| | | | |
|---|---|---|---|
| 5,818,989 A * | 10/1998 | Nakamura | G02B 6/125 385/39 |
| 6,571,039 B1 * | 5/2003 | Al-hemyari | G02B 6/1228 385/131 |
| 7,006,746 B2 * | 2/2006 | Blalock | G02B 6/125 385/131 |
| 7,016,560 B2 * | 3/2006 | Ticknor | G02B 26/005 385/15 |
| 7,120,336 B2 * | 10/2006 | Sandhu | G02B 6/12004 385/131 |
| 7,317,853 B2 * | 1/2008 | Laurent-Lund | G02B 6/1228 385/129 |
| 7,323,353 B2 * | 1/2008 | Sandhu | G02B 6/12004 385/144 |
| 7,359,607 B2 * | 4/2008 | Blalock | G02B 6/125 385/129 |
| 7,519,257 B2 * | 4/2009 | Lipson | B82Y 20/00 385/126 |
| 7,539,373 B1 * | 5/2009 | Logvin | G02B 6/12004 385/28 |
| 7,720,341 B2 * | 5/2010 | Blalock | G02B 6/125 385/129 |
| 7,796,656 B2 * | 9/2010 | Watson | H01S 5/12 372/102 |
| 7,831,116 B2 * | 11/2010 | Kim | G02B 6/4224 385/131 |
| 7,936,955 B2 * | 5/2011 | Blalock | G02B 6/125 385/129 |
| 8,170,383 B2 * | 5/2012 | Tokushima | G02B 6/1228 385/14 |
| 8,195,020 B2 * | 6/2012 | Sandhu | G02B 6/12004 385/129 |
| 8,488,923 B2 * | 7/2013 | Na | G02B 6/1228 385/14 |
| 9,042,697 B2 * | 5/2015 | Sandhu | G02B 6/12004 385/129 |
| 9,195,001 B2 * | 11/2015 | Hatori | G02B 6/1228 |
| 2001/0026670 A1 * | 10/2001 | Takizawa | G02B 6/1228 385/129 |
| 2003/0035446 A1 | 2/2003 | Griffel | |
| 2003/0210725 A1 * | 11/2003 | Prassas | H01S 3/063 372/50.1 |
| 2004/0066999 A1 | 4/2004 | Sakamoto et al. | |
| 2004/0114872 A1 | 6/2004 | Nagai | |
| 2004/0258360 A1 * | 12/2004 | Lim | B82Y 20/00 385/43 |
| 2006/0109542 A1 * | 5/2006 | Mizuuchi | G02F 1/3775 359/330 |
| 2007/0223549 A1 * | 9/2007 | Livshits | G02B 6/1228 372/45.01 |
| 2010/0266288 A1 * | 10/2010 | Little | G02B 6/1228 398/139 |
| 2012/0224813 A1 | 9/2012 | Chen et al. | |
| 2012/0230635 A1 * | 9/2012 | Yoshida | G02B 6/125 385/43 |
| 2013/0022312 A1 * | 1/2013 | Taillaert | G02B 6/12007 385/30 |
| 2015/0253471 A1 * | 9/2015 | Takahashi | G02B 6/122 385/122 |

* cited by examiner

HIGH-ORDER-MODE FILTER FOR SEMICONDUCTOR WAVEGUIDES

CROSS-REFERENCES TO RELATED APPLICATIONS

This application claims priority to U.S. Provisional Application No. 61/949,916, filed on Mar. 7, 2014, the disclosure of which is incorporated by reference in its entirety for all purposes.

BACKGROUND OF THE INVENTION

Optical waveguiding elements convey light from one point to another through an optically transparent, elongated structure by modal transmission, total internal reflection, and/or total reflectorization. An optical waveguide directs radiation in the visible, infrared, and/or ultra-violet portions of the radiation spectrum by total internal reflection.

BRIEF SUMMARY OF THE INVENTION

Embodiments of the present invention provide an optical filter for passing a fundamental mode of a guided optical wave while filtering/attenuating higher-order modes. Optical filters, in some embodiments, are used to filter higher-order modes from inside an optical resonator (e.g., a laser cavity). In some embodiments, optical filters are used to prevent higher-order modes from being excited in other structures (e.g., passive structures such as gratings, multimode interference structures, and/or directional couplers). In some embodiments, the optical filter does not bend the fundamental mode, reducing potential loss of the fundamental mode and/or saving space on a chip.

In some embodiments, an optical filter for attenuating higher-order modes in an optical waveguide comprises a shoulder slab, a waveguide ridge, a first filter ridge, and a second filter ridge. The shoulder slab has a near end opposite a far end; the shoulder slab is made of a first material having a first index of refraction; the shoulder slab is disposed on a second material having a second index of refraction; and the first index of refraction is higher than the second index of refraction. The waveguide ridge is disposed on the shoulder slab. The waveguide ridge traverses the shoulder slab from the near end to the far end; and the waveguide ridge is configured to receive light at the near end and guide the light to the far end. The first filer ridge is disposed on the shoulder slab; traverses the shoulder slab from the near end to the far end; is on a first side of the waveguide ridge; is separated from the waveguide ridge by a first gap. The second filter ridge traverses the shoulder slab from the near end to the far end; the second filter ridge is on a second side of the waveguide ridge; the second side of the waveguide ridge is opposite the first side of the waveguide ridge; and the second filter ridge is separated from the waveguide ridge by a second gap. In some embodiments, the waveguide ridge traverses the shoulder slab in a straight line from the near end to the far end. In some embodiments, a combined height of the shoulder slab and waveguide ridge is greater than 0.7 µm and less than 2.0 µm. in some embodiments, the first material is crystalline silicon and the second material is SiO2.

In some embodiments, a method for filtering higher-order modes in a semiconductor waveguide is disclosed. A beam of light having a fundamental mode and one or more higher-order modes is transmitted in a first semiconductor waveguide. In the optical filter, the one or more higher-order modes along a direction of beam propagation are attenuated while light of the fundamental mode is transmitted along the direction of beam propagation. The optical filter comprises a waveguide ridge for guiding the fundamental mode and two filter ridges separated from the waveguide ridge to assist in attenuating the one or more higher-order modes from along the direction of beam propagation. Light of the fundamental mode is coupled into a second semiconductor waveguide, after the light of the fundamental mode has passed through the optical filter and the one or more higher-order modes are attenuated along the direction of beam propagation.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
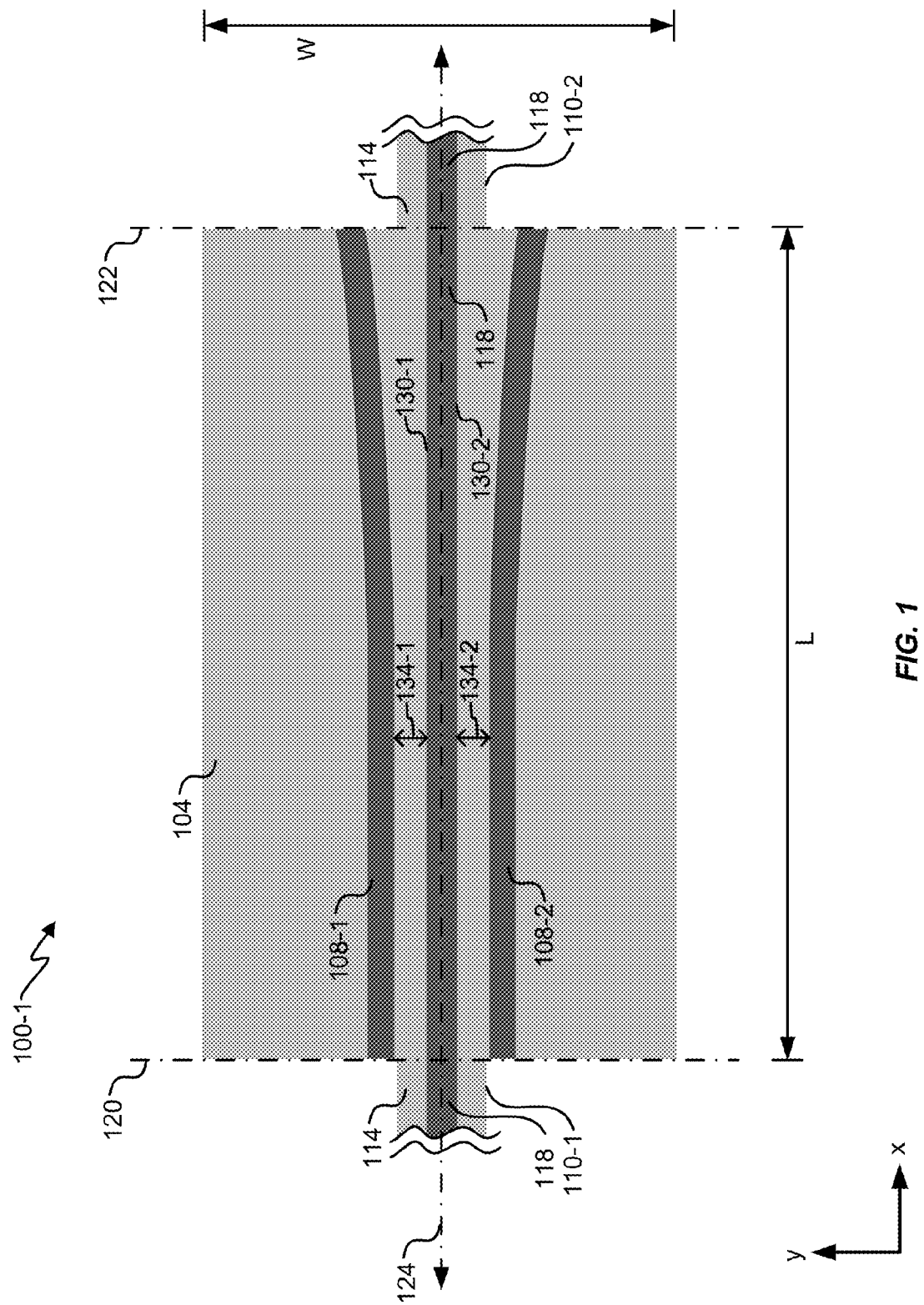
FIG. 1 depicts a simplified top view of an embodiment of a first optical filter for filtering higher-order modes.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Embodiments relate generally to filtering higher-order modes from a fundamental mode in an optical waveguide. More specifically, and without limitation, to filtering higher-order modes in high-contrast, thick-silicon waveguides.

Light propagating in higher-order modes can adversely affect performance of some optical devices. Filtering higher-order modes can increase performance and/or reduce loss in some optical devices. Higher-order modes in multi-mode, silica optical fibers can be attenuated by mandrel wrapping (wrapping an optical fiber around a specified sized rod a specified number of time). A somewhat corresponding technique in thin-silicon waveguides is to use bends in the thin-silicon waveguides. However, for thick-silicon (wherein thick silicon is greater than 0.3, 0.5, 0.7, or 0.9 µm thick and/or has an effective refractive index greater than or equal to 2.9, 3.0, or 3.2), bends are relatively large (e.g., ~750 µm radius) to prevent loss to the fundamental mode because thick silicon has a higher effective refractive index than thin silicon and the modes are more tightly confined. A relatively large bend requires longer waveguides (and hence more attenuation) and a larger footprint on a chip. Thus in some embodiments, optical filters for filtering higher-order modes are provided that are relatively short (e.g., length less than 150, 120, or 100 µm) and have a relatively small footprint (e.g., an area less than 6000, 4000, or 2400 µm$^2$). Some embodiments in this disclosure provide a higher-order mode filter in semiconductor material (e.g., in a semiconductor having a waveguide in a lattice, such as crystalline silicon and/or a crystalline III-V compound).

In some embodiments, a filter is made by layering a shoulder slab (e.g., comprising silicon) on top of a substrate (e.g., comprising silicon dioxide, SiO2). A waveguide ridge and two filter ridges are disposed on the shoulder. The waveguide ridge and the two filter ridges are substantially parallel. As light is guided in the waveguide ridge, a first mode (e.g., a fundamental mode) remains mostly confined in the waveguide ridge. But higher-order modes couple to the two filter ridges and energy in the higher-order modes is dispersed from being guided by the waveguide ridge. In some embodiments, there is little or no loss of energy of the first mode (e.g., 1$^{st}$ TE mode) and there is minimal transmission light in of higher-order modes (e.g., attenuation greater than or equal to 9 dB for the higher-order modes). In some embodiments, there is less than 10%, 5%, and/or 3% attenuation of the first mode (beyond attenuation of the first mode from material of the waveguide). Additionally, in some embodiments there are minimal reflections (e.g., <1%) from higher-order modes.

Referring first to FIG. 1, a simplified top view of an embodiment of first optical filter 100-1 for filtering higher-order modes is shown. The optical filter 100 comprises a substrate, a shoulder slab 104 disposed on the substrate, and one or more filter ridges 108 disposed on the shoulder slab 104. In the embodiment shown, there is a first filter ridge 108-1 and a second filter ridge 108-2. In some embodiments, the optical filter 100 comprises an upper cladding that covers the shoulder slab 104 and filter ridges 108. In some embodiments, the shoulder slab 104 and the filter ridges 108 are made of the same material (e.g., both crystalline silicon) and/or are contiguous. The shoulder slab 104 and/or the filter ridges 108 have a higher index of refraction than the substrate and the upper cladding. For example, in some embodiments the substrate and/or upper cladding is SiO2.

The optical filter 100 is coupled with two or more waveguides 110. Each waveguide 110 comprises a waveguide shoulder 114 and a waveguide ridge 118. In some embodiments, the two or more waveguides 110 are disposed on the same substrate as the optical filter 100. The optical filter 100 has a near end 120 and a far end 122, where the far end 122 is opposite the near end 120. A first waveguide 110-1 is coupled with the optical filter 100 at the near end 120. A second waveguide 110-2 is coupled with the optical filter 100 at the far end 122. The waveguide ridge 118 traverses the optical filter 100 from the near end 120 to the far end 122 and couples with the first waveguide 110-1 and the second waveguide 110-2. The waveguide ridge 118 creates an optical ridge waveguide for guiding a first mode from the near end 120 of the optical filter 100 to the far end 122 of the optical filter 100. In some embodiments, the waveguide shoulder 114, the waveguide ridge 118, the shoulder slab 104, and the filter ridges 108 are made of the same material (e.g., crystalline silicon). An optical axis 124 (e.g., direction of beam propagation for the fundamental mode) is parallel with the waveguide ridge 118. Though this embodiment has a straight waveguide ridge 118 in a direction of beam propagation, other embodiments have a curved waveguide ridge 118 (e.g., for connecting to another device in a different direction). In some embodiments, a straight waveguide ridge 118 is used to reduce loss of the first mode.

The first filter ridge 108-1 is disposed on the shoulder slab 104 and traverses the shoulder slab 104 from the near end 120 to the far end 122. The first filter ridge 108-1 is located in a direction away from a first side 130-1 of the waveguide ridge 118. The second filter ridge 108-2 is disposed on the shoulder slab 104 and traverses the shoulder slab 104 from the near end 120 to the far end 122. The second filter ridge 108-2 is located in a direction away from a second side 130-2 of the waveguide ridge 118. The sides 130 of the waveguide ridge 118 are orthogonal, or nearly orthogonal, to the direction of beam propagation of the fundamental mode through the waveguide ridge 118. The first side 130-1 is opposite the second side 130-2. A first gap 134-1 separates the first filter ridge 108-1 from the waveguide ridge 118. A second gap 134-2 separates the second filter ridge 108-2 from the waveguide ridge 118. The shoulder slab 104 has a length L along an x direction, (e.g., the direction of beam propagation). The shoulder slab 104 has a width W along a y direction (e.g., a transverse direction to the direction of beam propagation). Widths of gaps 134 are measured along the y direction.

As an example of how the first optical filter 100-1 works, light enters the optical filter 100 at the near end 120 through the first waveguide 110-1. Light that propagates in a first mode of the first waveguide 110-1 is guided to the far end 122 of the optical filter 100 and to the second waveguide 110-2 by the waveguide ridge 118. But light that propagates in higher-order modes (e.g., higher than the 1$^{st}$ mode and/or higher than both the first TE mode and the first TM mode) from the first waveguide 110-1 is coupled out of the waveguide ridge 118 by the first filter ridge 108-1 and the second filter ridge 108-2, and does not couple into the second waveguide 110-2.

Figure 2:
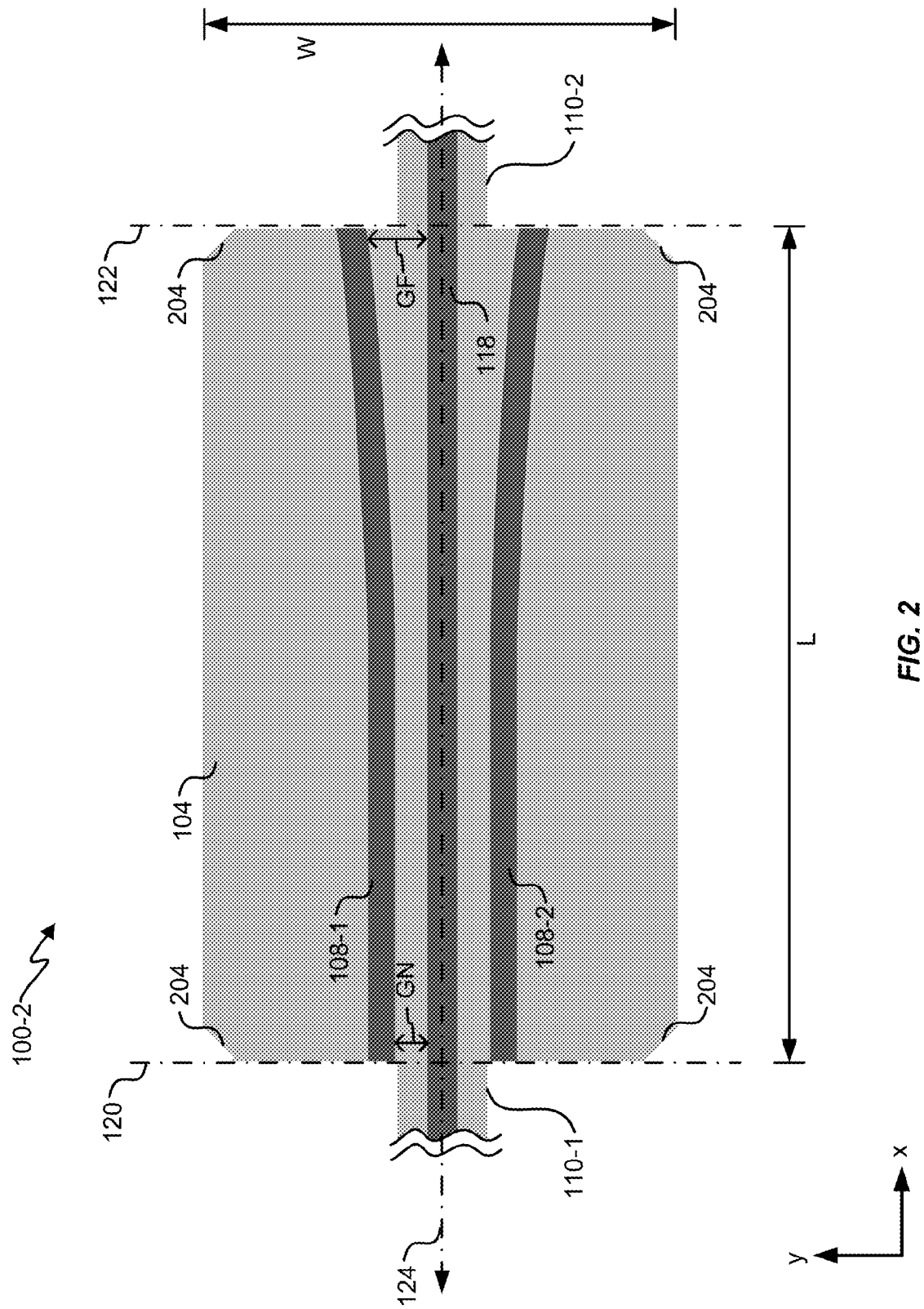
FIG. 2 depicts a simplified top view of an embodiment of a second optical filter for filtering higher-order modes.

Referring next to FIG. 2, a simplified top view of a second optical filter 100-2 for filtering higher-order modes is shown. The second optical filter 100-2 is similar to the first optical filter 100-1, except the shoulder slab 104 of the second optical filter 100-2 has beveled corners 204. The beveled corners 204 are used to reduce the likelihood that reflections from higher-order modes will reflect back into the waveguides 110. The beveled corners 204 in the second optical filter 100-2 are shown as straight bevels set at 45 degrees. But other types of bevels could be used (e.g., rounded bevels and/or straight bevels at angles greater than or less than 45 degrees). In some embodiments, straight bevels at 45 degrees are used because of ease of manufacturing and the 45 degrees encourages light from higher-order modes to reflect around in the shoulder slab 104 instead of into the waveguides 110.

In some embodiments, a width of the first gap 134-1 and a width of the second gap 134-2 are functions of length of the shoulder slab 104 (e.g., gap width is a function of x). In some embodiments, a width of the first gap 134-1 and a width of the second gap 134-2 have constant values for x=0 to x=L/2. From x=L/2 to x=L, the filter ridges 108 bend away from the waveguide ridge 118 along an arc, wherein the arc has a radius of curvature R. In some embodiments, R=500 µm±50 µm, L=100 µm±10 µm, and W=40 µm±5 µm. In some embodiments, the first gap 134-1 has a width, GN, at the near end 120, and a width, GF, at the far end 122. In some embodiments, the width of the second gap 134-2 is equal to the width of the first gap 134-1 for all values x (e.g., the optical filter 100 is symmetrical about the optical axis 124).

Figure 3:
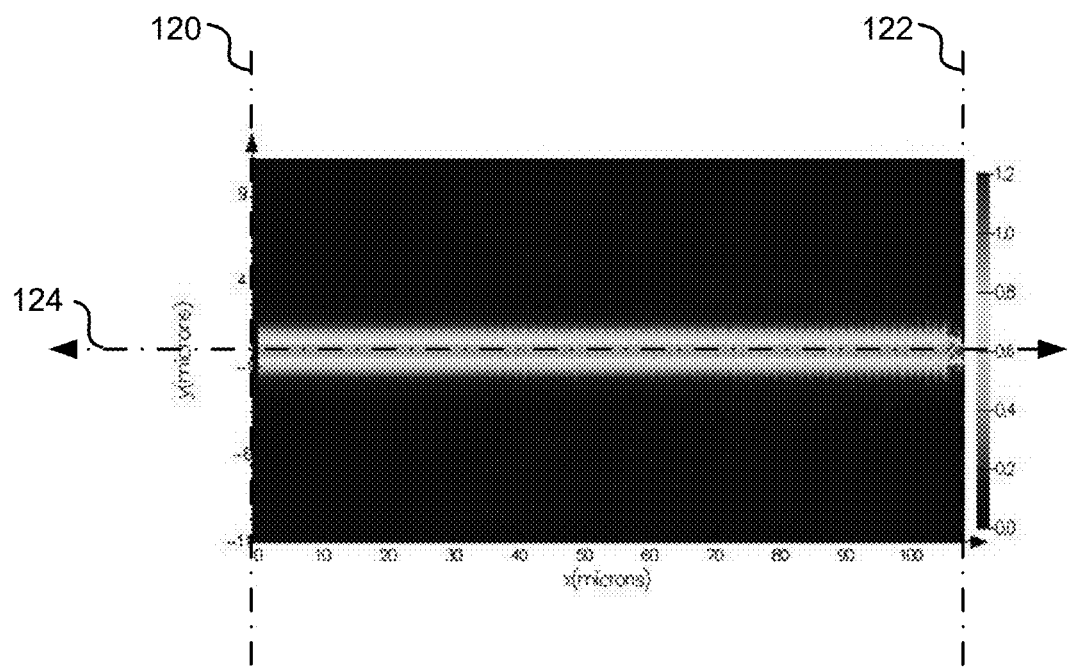
FIG. 3 depicts a simulation of a fundamental mode in an optical filter for filtering higher-order modes.

FIG. 3 depicts a simulation of a fundamental mode in an optical filter for filtering higher-order modes. The fundamental mode (e.g., first mode) is transmitted from the near end 120 of the optical filter 100 to the far end 122 of the optical filter 100 confined by the waveguide ridge 118. (i.e., not much light is dispersing into other regions of the shoulder slab 104).

Figure 4:
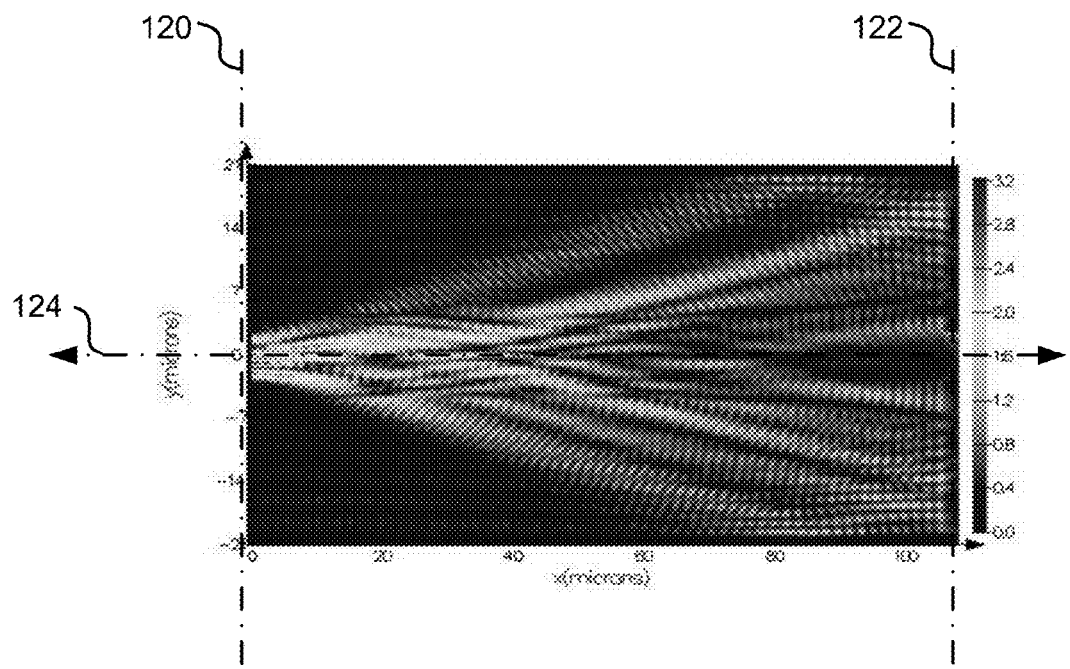
FIG. 4 depicts a simulation of higher-order modes being attenuated in the optical filter.

FIG. 4 depicts a simulation of higher-order modes being scattered in the optical filter 100. In FIG. 4, TE modes two through seven are simulated. As mode number increases, loss increases (e.g., measured by a percentage of light of a given mode from the first waveguide 110-1 that is not coupled into the second waveguide 110-2). In comparison to FIG. 3, light in higher-order modes is greatly attenuated along the waveguide ridge 118 when transmitted from the near end 120 to the far end 122 (i.e., very little light propagating in higher-order modes exits the filter 100 and into the second waveguide 110-2). Higher-order modes have more attenuation along the optical axis 124 because the higher-order modes are not as suppressed by the waveguide ridge 118 (e.g., higher-order modes are larger and/or have a diffraction angle that causes the higher-order modes to disperse). In some embodiments, lengths and widths are important for a compact and/or efficient optical filter 100.

Figure 5:
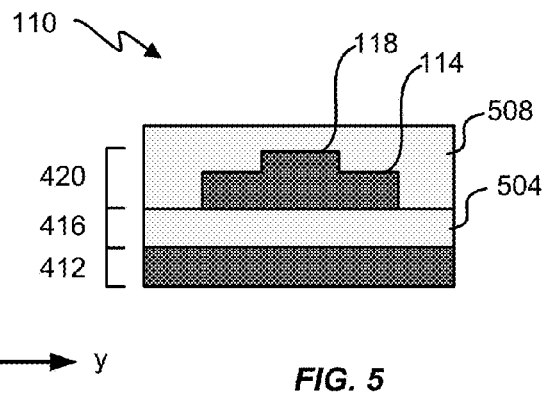
FIG. 5 depicts a simplified cross section of an embodiment of a waveguide.

FIG. 5 depicts a simplified cross section of an embodiment of a waveguide 110. The waveguide 110 comprises a waveguide shoulder 114 and a waveguide ridge 118 on top of the waveguide shoulder 114. The waveguide ridge 118 is more narrow than the waveguide shoulder 114. Both the waveguide shoulder 114 and the waveguide ridge 118 are made of crystalline silicon. The waveguide shoulder 114 is disposed on a substrate 504. An upper cladding 508 covers the waveguide shoulder 114 and the waveguide ridge 118. In some embodiments, the waveguide 110 is made from a silicon-on-insulator (SOI) wafer. The SOI wafer has a handle portion 512, a buried oxide (BOX) portion 516 (e.g., SiO2), and a device layer 520. The BOX portion 516 comprises the substrate 504. The waveguide shoulder 114 and the waveguide ridge 118 are formed by etching the device layer 520. After the waveguide shoulder 114 and the waveguide ridge 118 are formed, the waveguide shoulder 114 and the waveguide ridge 118 are covered with the upper cladding 508 (e.g., SiO2, epoxy, and/or photoresist). Similarly, in some embodiments, the optical filter 100 is also formed using a SOI wafer and covered with an upper cladding 508. In some embodiments, the optical filter 100 is formed at the same time as the waveguide 110. SiO2 has a lower index of refraction than crystalline silicon.

In some embodiments, the waveguide shoulder 114 has a width (y direction) between 2 and 10 µm (e.g., 4, 5, 6, or 7 µm). The waveguide shoulder 114 has a height (z direction) between 0.1 to 5 µm, or 0.5 to 3 µm (e.g., 0.25, 0.4, 0.5, 0.75, 0.85, 0.95, 1, 1.05, 1.1, 1.25, 1.5, or 1.75 µm). The waveguide ridge 118 has a width (y direction) between 1 and 4 µm, (e.g., 1.5, 2.0, 2.2, 2.4, or 2.5 µm). The waveguide ridge 118 has a height (z direction) (above the waveguide shoulder 114) between 0.1 and 3 µm (e.g., 0.25, 0.45, 0.50, 0.55, 0.60, 0.75, µm). In some embodiments, the waveguide shoulder 114 and the waveguide ridge 118 have a combined height (z direction) between 0.5 and 5 µm (e.g., 0.7, 1.0, 1.5, 1.25, 1.5, or 2 µm). Though the waveguide 110 is shown having the waveguide ridge 118, in some embodiments, the waveguide has a rectangular cross section (e.g., the width of the waveguide ridge 118 is equal to the width of the waveguide shoulder 114; or viewed another way, the height of the waveguide ridge 118 equals zero, and/or the waveguide shoulder 114 has a height greater than a height of the shoulder slab 104). The waveguide shoulder 114 and the waveguide ridge 118 act as a core of the waveguide 110. The substrate 504 and the upper cladding 508 are cladding layers to the core. In some embodiments, the upper cladding 508 is air. The upper cladding 508 and the substrate 504 are made of materials that have a lower index of refraction than the core.

Figure 6:
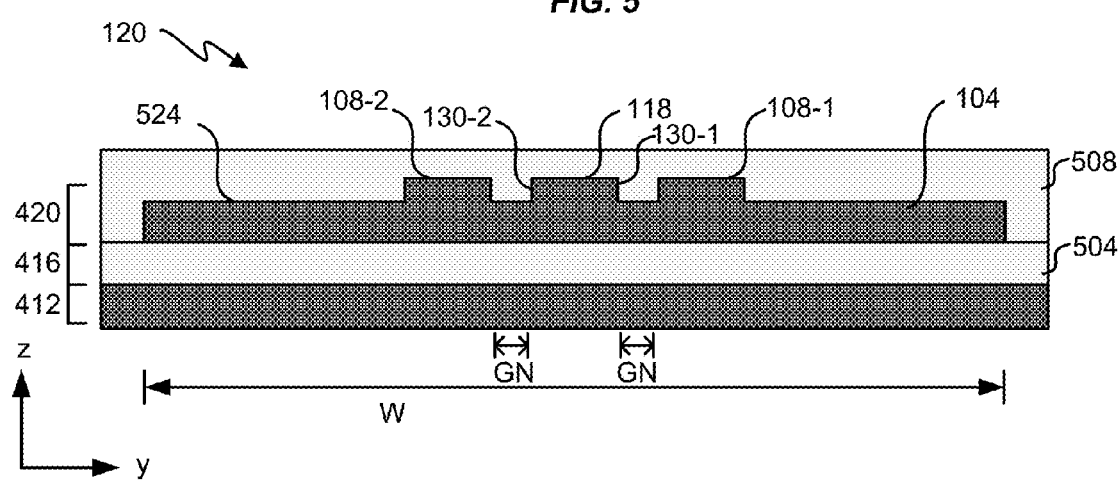
FIG. 6 depicts an embodiment of a cross section at a near end of an optical filter.

Referring next to FIG. 6, an embodiment of a cross section at the near end 120 of an optical filter 100 is shown. The cross section at the near end 120 shows the shoulder slab 104 disposed on the substrate 504. In some embodiments, the height of the shoulder slab 104 is 0.1 to 5 µm tall, in a z direction (e.g., 0.25, 0.4, 0.5, 0.75, 0.85, 0.95, 1, 1.05, 1.1, 1.25, 1.5, or 1.75 µm). In some embodiments, the height of the shoulder slab 104 is equal to the height of the waveguide shoulder 114. Three ridges extend from the shoulder slab 104 and in a direction normal to a top surface 524 of the shoulder slab 104: the first filter ridge 108-1, the second filter ridge 108-2, and the waveguide ridge 118. In some embodiments, the first filter ridge 108-1 and the second filter ridge 108-2 have similar heights and widths as the waveguide ridge 118. The first filter ridge 108-1 and the waveguide ridge 118 are separated by GN (width of the first gap 134-1 at the near end 120). The second filter ridge 108-2 and the waveguide ridge 118 are separated by the distance GN (width of the second gap 134-2 at the near end 120). In some embodiments, GN is between 1 and 5 µm (e.g., 1, 1.5, 2, 2.5, or 3 µm).

Figure 7:
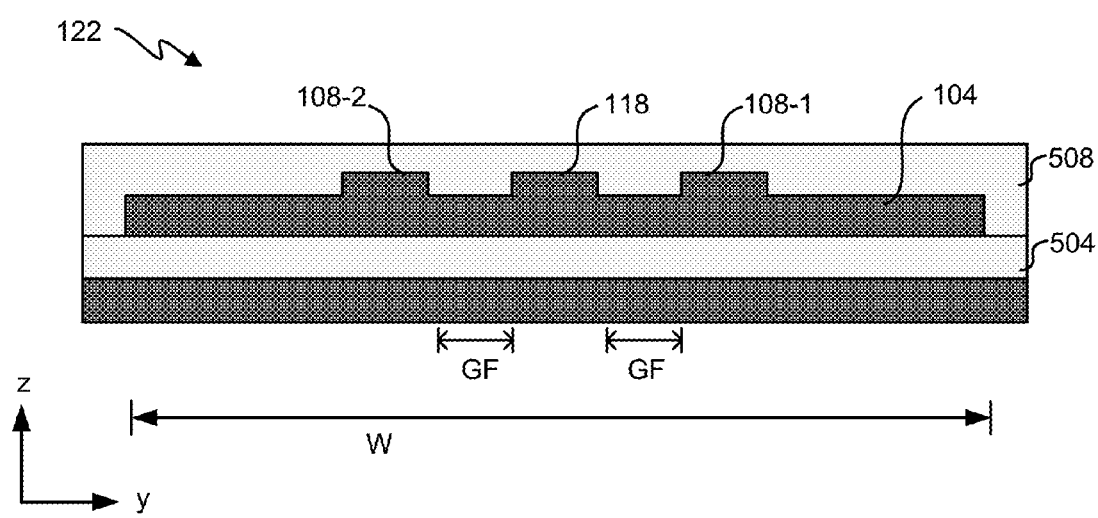
FIG. 7 depicts an embodiment of a cross section at a far end of the optical filter.

Referring next to FIG. 7, an embodiment of a cross section at the far end 122 of an optical filter 100 is shown. The cross section at the far end 122 is similar to the cross section at the near end 120 in FIG. 6, except widths of the gaps 134 between the waveguide ridge 118 and the filter ridges 108 is increased. In some embodiments, heights and widths of the waveguide ridge 118 and the filter ridges 108 remain constant. The first filter ridge 108-1 and the waveguide ridge 118 are separated by GF (width of the first gap 134-1 at the far end 122). The second filter ridge 108-2 and the waveguide ridge 118 are separated by the distance GF (width of the second gap 134-2 at the far end 122). In some embodiments, GF is between 1.5 and 10 µm (e.g., 2, 3, or 5 µm). In some embodiments, GF is equal to GN.

There are many variations to the embodiments that are shown and described above. For example, the figures above show embodiments designed for 1550 nm light. For different wavelengths, different dimensions can be used. For example, widths of ridges, heights/thickness of shoulders and ridges, and gaps between ridges can be narrowed for shorter wavelengths of light. Additionally, the filter ridges 108 can be doped with lossy material. In some embodiments, the filter ridges 108 are coated with metal, germanium, or other lossy materials.

Figure 8:
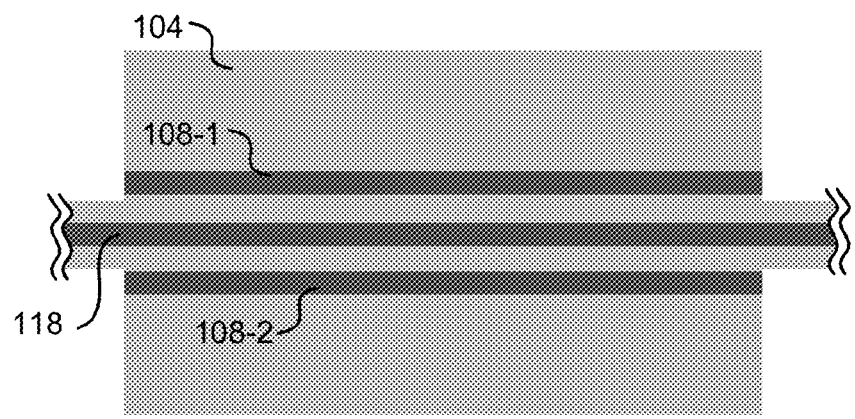
FIGS. 8-16 depict additional example embodiments of optical filters.
Figure 9:
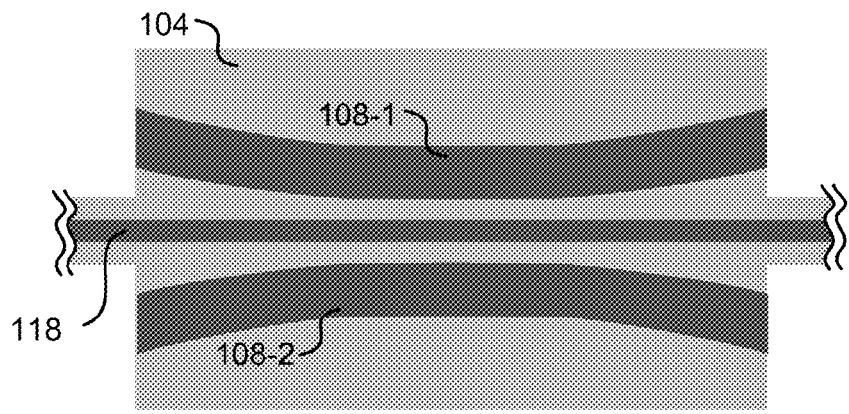
Figure 10:
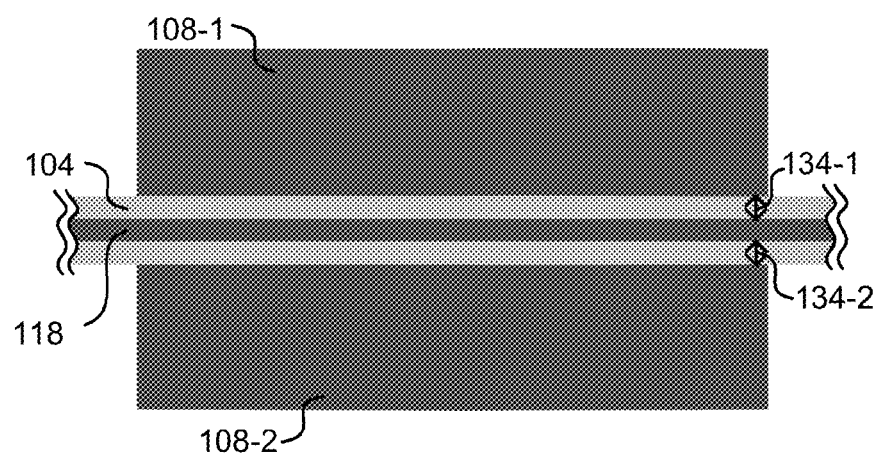

FIGS. 5-16 depict additional example variations of optical filters 100. Persons skilled in the art will recognize the examples in FIGS. 8-16 are not meant to provide an exhaustive list but that additional variations and/or combinations could be used. In FIG. 8, the filter ridges 108 do not bend, but are straight. In FIG. 9, the filter ridges 108 are much wider than the waveguide ridge 118. In some embodiments, the filter ridges 108 have a width that is equal to or greater than twice the width of the waveguide ridge 118. Additionally, the filter ridges 108 bend at the near 120 and the far end 122, such that the near end 120 is symmetrical to the far end (i.e., the optical filter 100 in FIG. 9 is reversible). In some embodiments, having a reversible filter is not desirable because bending regions of the ridges 108 decrease coupling, and the filter might have to be longer. In FIG. 10, another reversible filter, the filter ridges 108 have width from the gaps 134 to an edge of the shoulder slab 104; and a width of the gaps 134 remains constant.

Figure 11:
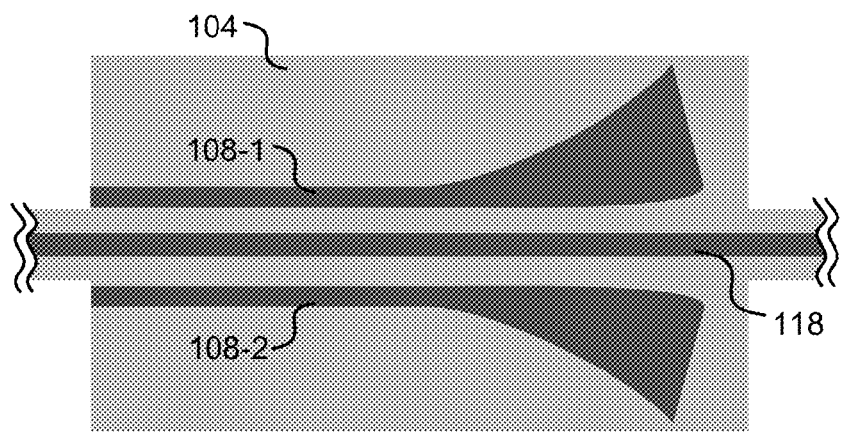
Figure 12:
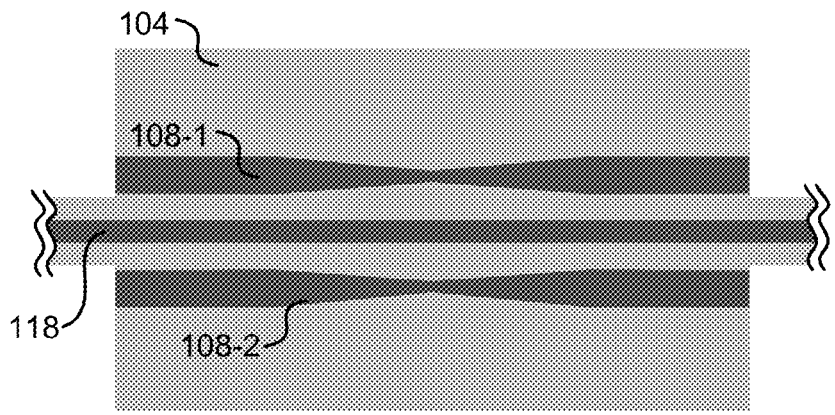
Figure 13:
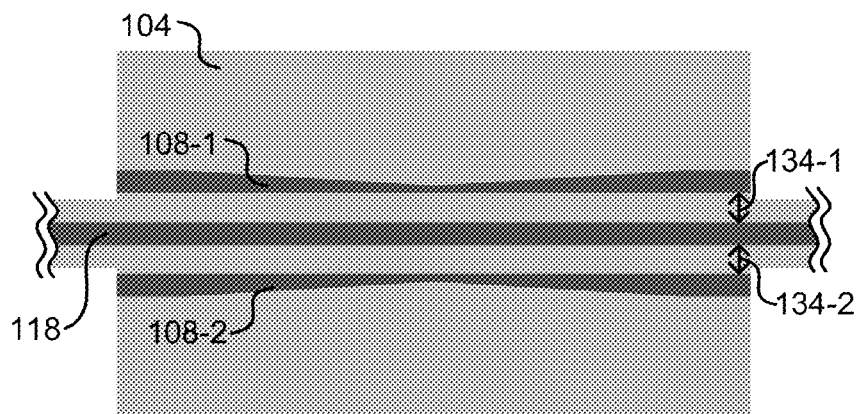

In FIG. 11, the filter ridges 108 are tapered at ends and do not extend to the far end 122. In FIG. 12, the ridges 108 taper (narrow) on each side of the filter ridge 108 and taper (expand) on each side of the filter ridge 108. FIG. 13 is similar to FIG. 12, except only one side of each filter ridge 108 (an outer side) narrows and expands, leaving widths of gaps 132 constant. In some embodiments, the ridges 108 taper in (e.g., in FIGS. 12 and 13) to better couple (i.e., filter) different modes. For example, a filter ridge 108 that is more narrow is likely to better couple modes that are higher than a filter ridge 108 that is wider. In some embodiments, widths of ridges 108 keep expanding from the near end 120 to the far end 122 (e.g., constant width for a first distance, taper wider, constant width for a second distance, taper even wider, etc.; or one continuous taper from the near end 120 to the far end 122).

Figure 14:
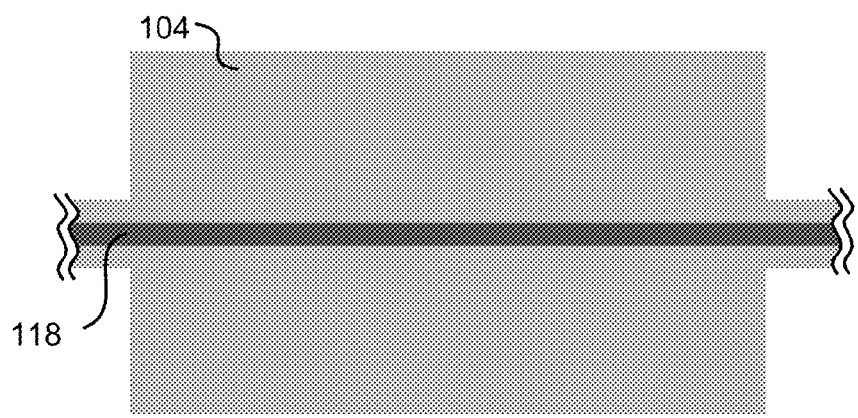
Figure 15:
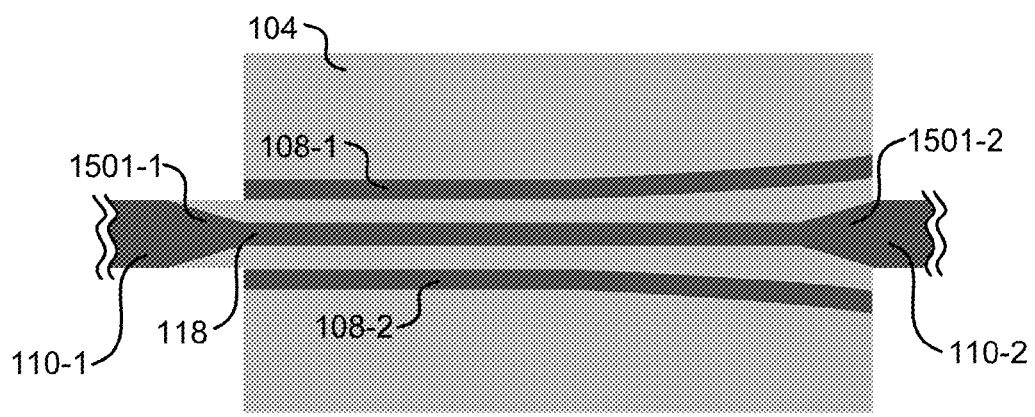
Figure 16:
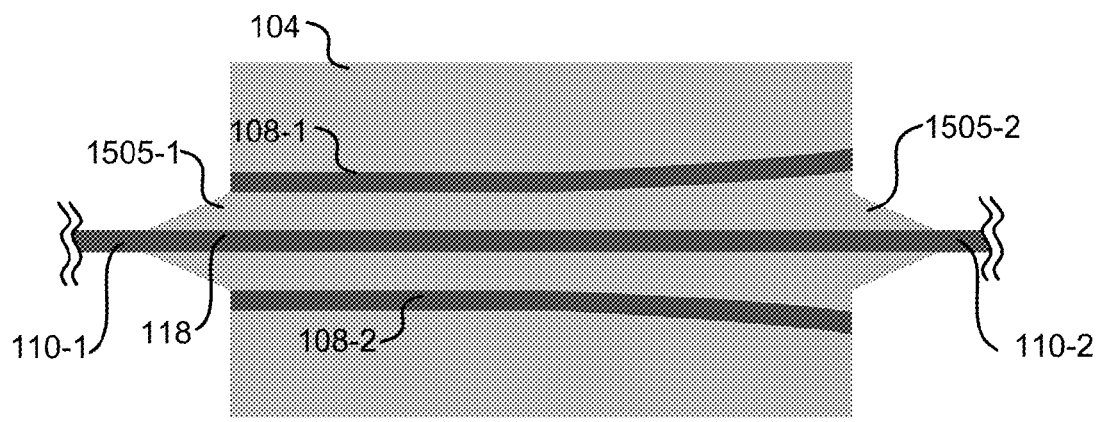

In FIG. 14, there are no filter ridges 108, and higher-order modes "leak out" into the shoulder 104, away from the waveguide ridge 118. Such a configuration may need to be longer than a filter with filter ridges 108. FIGS. 15 and 16 provide examples of an optical filter 100 coupling to waveguides 110 that have a rectangular cross section. FIG. 15 uses a first waveguide-ridge taper 1501-1 and a second waveguide-ridge taper 1501-2. The first waveguide-ridge taper 1501-1 narrows a top portion of the first waveguide 110-1 to a width of the waveguide ridge 118. Without the first waveguide-ridge taper 1501-1 there would be reflections from the first waveguide 110-1 coupling into the optical filter 100. The second waveguide-ridge taper 1501-2 begins to taper within the optical filter 100 before coupling to the second waveguide 110-2 to reduce a length of a combination of the optical filter 100 and second waveguide 110-2. In some embodiments, the second waveguide ridge 1501-2 tapers after the optical filter 100. FIG. 16 uses a first shoulder taper 1505-1 and a second shoulder taper 1505-2 to narrow the shoulder slab 104 to the first waveguide 110-1 and to the second waveguide 110-2. The first waveguide 110-1 and the second waveguide 110-2 each have a width as wide as the waveguide ridge 118.

In some embodiments, the shoulder slab 104 is much thinner, or not used at all (e.g., the waveguide ridge 118 and the filter ridges 108 are disposed on the substrate 504 without a shoulder). The width of the first gap 134-1 and the width of the second gap 134-2 are then decreased so that higher-order modes are coupled into the filter ridges 108 but the fundamental mode is not. In some embodiments, a shoulder, which is wider than the waveguide ridge 118, is disposed on the substrate 504 under the waveguide ridge 118, but the filter ridges 108 do not have shoulders wider than the filter ridges 108. In some embodiments, the waveguide ridge 118 has a shoulder wider than the waveguide ridge 118, the first filter ridge 108-1 has a shoulder wider than the first filter ridge 108-1, and the second filter ridge 108-2 has a shoulder wider than the second filter ridge 108-2; but the shoulder of the waveguide ridge 118 does not touch the shoulder of the first filter ridge 108-1 or the shoulder of the second filter ridge 108-2. In some embodiments, shoulders of the waveguide ridge 118, the first filter ridge 108-1, and/or the second filter ridge 108-2 are tapered.

In some embodiments, the filter ridges 108 do not entirely traverse the shoulder slab 104. For example, the first filter ridge 108-1 could extend from the near end 120 and terminate before reaching the far end 122. In some embodiments, a ridge is disposed on a shoulder either through deposition or by etching areas next to the ridge to form the ridge on the shoulder. In another example, the waveguide ridge 118 is disposed on a shoulder region; and the shoulder region extends beyond the filter ridges 108 and/or the shoulder slab 104 (e.g., to the edge of the substrate). In this example, a shoulder slab can be defined as a sub-area of the shoulder region (i.e., the shoulder region need not terminate at a boundary of the shoulder slab 104). In some embodiments, ends of the filter ridges 108 are modified, such as using single-sided or double-sided tapers (e.g., expanding or narrowing tapers).

Several embodiments are directed to thick-silicon, high-contrast waveguides. But in some embodiments, optical filters 100 are used in other multimode and single-mode waveguides. For example, filters can be made of polymers for polymer waveguides. Filters can be made for low-contrast, and/or thin-silicon, waveguides. In some embodiments, filters are made of aluminum oxide, tantalum oxide, titanium oxide, or other dielectric materials (e.g., to increase attenuation of higher-order modes). In some embodiment, a filter is used to filter out reflections or other light from a single-mode waveguide. The single-mode waveguide could be in a semiconductor, dielectric, and/or polymer. For example, a ~300 nm tantalum oxide waveguide is used in the hard-drive industry. These waveguides usually support only a fundamental TE/TM mode. If light is scattered or reflected into a waveguide (e.g., through a bend or shoulder region), then a filter using similar techniques can be used to reduce the scattered or reflected light (e.g., a leaky mode) traveling in the single-mode (or multimode) waveguide. In some embodiments, waveguides 110 and optical filters 100 are made of III-V compounds (e.g., GaAs, InP, InGaAs, etc.) and/or II-VI compounds. In some embodiments, filter ridges 108 terminate (e.g., at a wall at the far end 122) so that light from the filter ridges 108 is not guided to another device and/or structure beyond the filter 100. In some embodiments, the waveguide ridge 118 is straight from the near end 120 to the far end 122. By not having bends in the waveguide ridge 118 of the optical filter 100, there is less attenuation of the fundamental mode.

Figure 17:
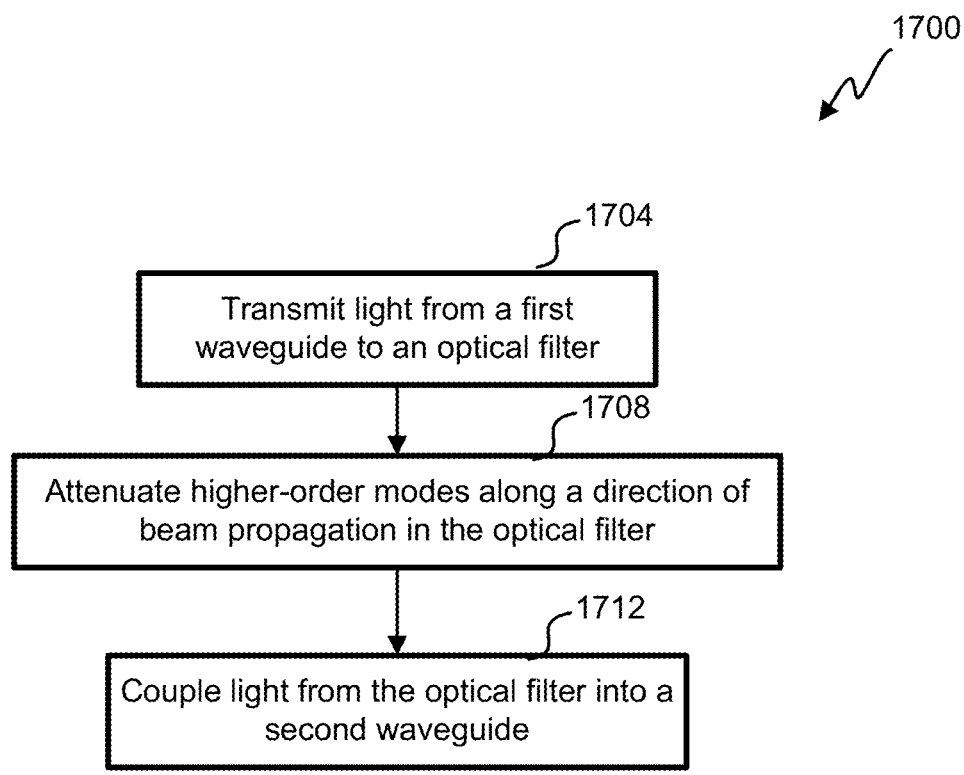
FIG. 17 depicts a flowchart of an embodiment of a process for using an optical filter to attenuate higher-order modes from a fundamental mode in a semiconductor waveguide.

FIG. 17 depicts a flowchart of an embodiment of a process 1700 for filtering higher-order modes in a semiconductor waveguide. The process 1700 starts in step 1704, a beam of light is transmitted from a first semiconductor waveguide 110-1 to an optical filter 100. The beam of light comprises light in a fundamental mode and light in one or more higher-order modes. In step 1708 higher-order modes are attenuated from along a direction of beam propagation (e.g., a direction of the waveguide ridge 118). The fundamental mode is directed along the direction of beam propagation (e.g., attenuated from under the waveguide ridge 118). In some embodiments, the higher-order modes are attenuated by coupling power of the higher-order modes to the two filter ridges 108 and/or the shoulder slab 104. In step 1712, light from the optical filter 100 is coupled into the second waveguide 110-2. Since the higher-order modes are attenuated, and the fundamental mode is not, light entering the second waveguide 110-2 is single mode, or nearly single mode. In some embodiments, the waveguide ridge 118 is straight to reduce loss by bending, and/or to reduce a footprint size of the optical filter on a chip.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above.

The embodiments were chosen and described in order to explain the principles of the invention and practical applications to thereby enable others skilled in the art to best utilize the invention in various embodiments and with various modifications as are suited to the particular use contemplated.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. An optical filter for attenuating higher-order modes that couples directly with an input optical waveguide and an output optical waveguide, the filter comprising:
   an input region including a first waveguide ridge portion and a shoulder portion;
   a shoulder slab;
   a second waveguide ridge portion; and
   first and second filter ridges;
   wherein:
   the input optical waveguide, the input region, the shoulder slab, the second waveguide ridge portion, and the first and second filter ridges are all integrally formed of a first material having a first index of refraction;
   the shoulder portion and the first waveguide ridge portion extend along a propagation direction of the input optical waveguide;
   the shoulder slab consists of a rectangular portion of the first material that defines first, second, third and fourth edges, wherein:
      the shoulder slab has a near end corresponding to the first edge, the first edge being orthogonal to the propagation direction and abutting the shoulder portion of the input region, opposite a far end corresponding to the third edge, the third edge being orthogonal to the propagation direction and abutting the output optical waveguide;
      the second and fourth edges of the shoulder slab are parallel to the propagation direction;
      the shoulder slab is disposed on a first portion of a second material having a second index of refraction;
      a second portion of the second material is disposed on and overlaps the shoulder slab, such that the second portion of the second material contacts the first portion of the second material about each of the first, second, third and fourth edges of the shoulder slab except at the input region and the output optical waveguide; and
      the first index of refraction is higher than the second index of refraction;
   the second waveguide ridge portion is disposed on the shoulder slab, wherein: the second waveguide ridge portion traverses the shoulder slab from the near end to the far end and is configured to receive light at the near end and deliver the light into the output optical waveguide at the far end;
   the first filter ridge is disposed on the shoulder slab;
   the first filter ridge traverses the shoulder slab from the near end to the far end;
   the first filter ridge is on a first side of the second waveguide ridge portion; and
   the first filter ridge is separated from the second waveguide ridge portion by a first gap;
   the second filter ridge traverses the shoulder slab from the near end to the far end;
   the second filter ridge is on a second side of the second waveguide ridge portion;
   the second side of the waveguide ridge is opposite the first side of the second waveguide ridge portion; and
   the second filter ridge is separated from the second waveguide ridge portion by a second gap.

2. The optical filter for attenuating higher-order modes in an optical waveguide of claim 1, wherein the second waveguide ridge portion traverses the shoulder slab in a straight line from the near end to the far end.

3. The optical filter for attenuating higher-order modes in an optical waveguide of claim 1, wherein a combined height of the shoulder slab and the second waveguide ridge portion is greater than 0.7 μm and less than 2.0 μm.

4. The optical filter for attenuating higher-order modes in an optical waveguide of claim 1, wherein the first material is crystalline silicon.

5. The optical filter for attenuating higher-order modes in an optical waveguide of claim 1, wherein a width of the first gap is equal to a width of the second gap.

6. The optical filter for attenuating higher-order modes in an optical waveguide of claim 1, wherein the shoulder slab is less than 150 microns long, the length of the shoulder slab being measured from the near end to the far end.

7. The optical filter for attenuating higher-order modes in an optical waveguide of claim 1, wherein a width of the first gap varies along a length of the shoulder slab.

8. The optical filter for attenuating higher-order modes in an optical waveguide of claim 1, wherein the shoulder slab has beveled corners.

9. The optical filter for attenuating higher-order modes in an optical waveguide of claim 1, wherein a width of the first filter ridge and a width of the second filter ridge are at least twice as wide as a width of the second waveguide ridge portion.

10. An optical filter for attenuating higher-order modes in an optical waveguide the filter comprising:
- a shoulder slab, wherein:
  - the shoulder slab has a near end opposite a far end;
  - the shoulder slab is made of a first material having a first index of refraction;
  - the shoulder slab is disposed on a second material having a second index of refraction; and
  - the first index of refraction is higher than the second index of refraction;
- a waveguide ridge disposed on the shoulder slab, wherein:
  - the waveguide ridge traverses the shoulder slab from the near end to the far end; and
  - the waveguide ridge is configured to receive light at the near end and guide the light to the far end;
- a first filter ridge, wherein:
  - the first filer ridge is disposed on the shoulder slab;
  - the first filter ridge traverses the shoulder slab from the near end to the far end;
  - the first filter ridge is on a first side of the waveguide ridge;
  - the first filter ridge is separated from the waveguide ridge by a first gap; and
  - a width of the first filter ridge extends from the first gap to a side of the shoulder slab; and
- a second filter ridge, wherein:
  - the second filter ridge traverses the shoulder slab from the near end to the far end;
  - the second filter ridge is on a second side of the waveguide ridge;
  - the second side of the waveguide ridge is opposite the first side of the waveguide ridge;
  - the second filter ridge is separated from the waveguide ridge by a second gap; and
  - a width of the second filter ridge extends from the second gap to a side of the shoulder slab.

11. The optical filter for attenuating higher-order modes in an optical waveguide of claim 1, wherein the first filter ridge and the second filter ridge doped with a lossy material.

12. The optical filter for attenuating higher-order modes in an optical waveguide of claim 11, wherein Germanium is deposited on the first filter ridge and the second filter ridge and/or at least a portion of the first filter ridge is made using Germanium.

13. The optical filter for attenuating higher-order modes in an optical waveguide of claim 1, wherein the first filter ridge and the second filter ridge are made out of the first material, and metal is deposited on the first filter ridge and on the second filter ridge.

14. The optical filter for attenuating higher-order modes in an optical waveguide of claim 1, wherein the optical filter is symmetric along an axis running along a length of the second waveguide ridge portion.

15. The optical filter for attenuating higher-order modes in an optical waveguide of claim 1, wherein the optical filter is disposed inside an optical resonator.

* * * * *